United States Patent [19]

Ulrich et al.

[11] Patent Number: 5,208,814
[45] Date of Patent: May 4, 1993

[54] METHOD AND APPARATUS FOR OPERATING AN ELECTRONIC REPROGRAPHIC PRINTING SYSTEM CONTAINING A JOB SUBMIT COUNTER

[75] Inventors: Dennis B. Ulrich, Fairport; David L. Salgado, Rochester; Elizabeth A. Bennett, Penfield, all of N.Y.

[73] Assignee: Xerox Corporation, Stamford, Conn.

[21] Appl. No.: 589,684

[22] Filed: Sep. 28, 1990

[51] Int. Cl.$^5$ ............................................. G06F 11/00
[52] U.S. Cl. ..................................... 371/16.4; 371/7; 371/5.1
[58] Field of Search ..................... 371/16.5, 17, 29.1, 371/16.4, 5.1, 25.1, 7, 5.5, 15.1; 355/304, 204, 205, 206; 364/200 MS File

[56] References Cited

U.S. PATENT DOCUMENTS

| | | | |
|---|---|---|---|
| 3,575,589 | 4/1971 | Neema et al. | 371/17 |
| 4,339,657 | 7/1982 | Larson et al. | 235/922 C |
| 4,514,846 | 4/1985 | Federico et al. | 371/16.4 |
| 4,549,296 | 10/1985 | Castel et al. | 371/16.5 |
| 4,745,602 | 5/1988 | Morrell | 371/20 |
| 4,866,712 | 9/1989 | Chao | 371/5.1 |
| 4,908,811 | 3/1990 | Yokogawa et al. | 369/54 |
| 5,084,875 | 1/1992 | Weinberger et al. | 371/16.4 |

*Primary Examiner*—Robert W. Beausoliel, Jr.
*Assistant Examiner*—Phung My Chung
*Attorney, Agent, or Firm*—Oliff & Berridge

[57] ABSTRACT

An apparatus provides for operating an electronic reprographic system containing a method for recovering from crashes in an electronic reprographic system in which multiple jobs are active concurrently. The system provides for the monitoring of jobs active in the system, and of the number of times a specific job is active and the system crashes. By comparing the number of times a crash occurs when a specific job is active with a predetermined threshold number the operator can evaluate whether the system may be corrupted by a specific job or by the concurrency of jobs. The method further provides the operator with instructions to activate the jobs one at a time to determine which job is corrupt and permits the operator to delete a corrupt job.

6 Claims, 10 Drawing Sheets

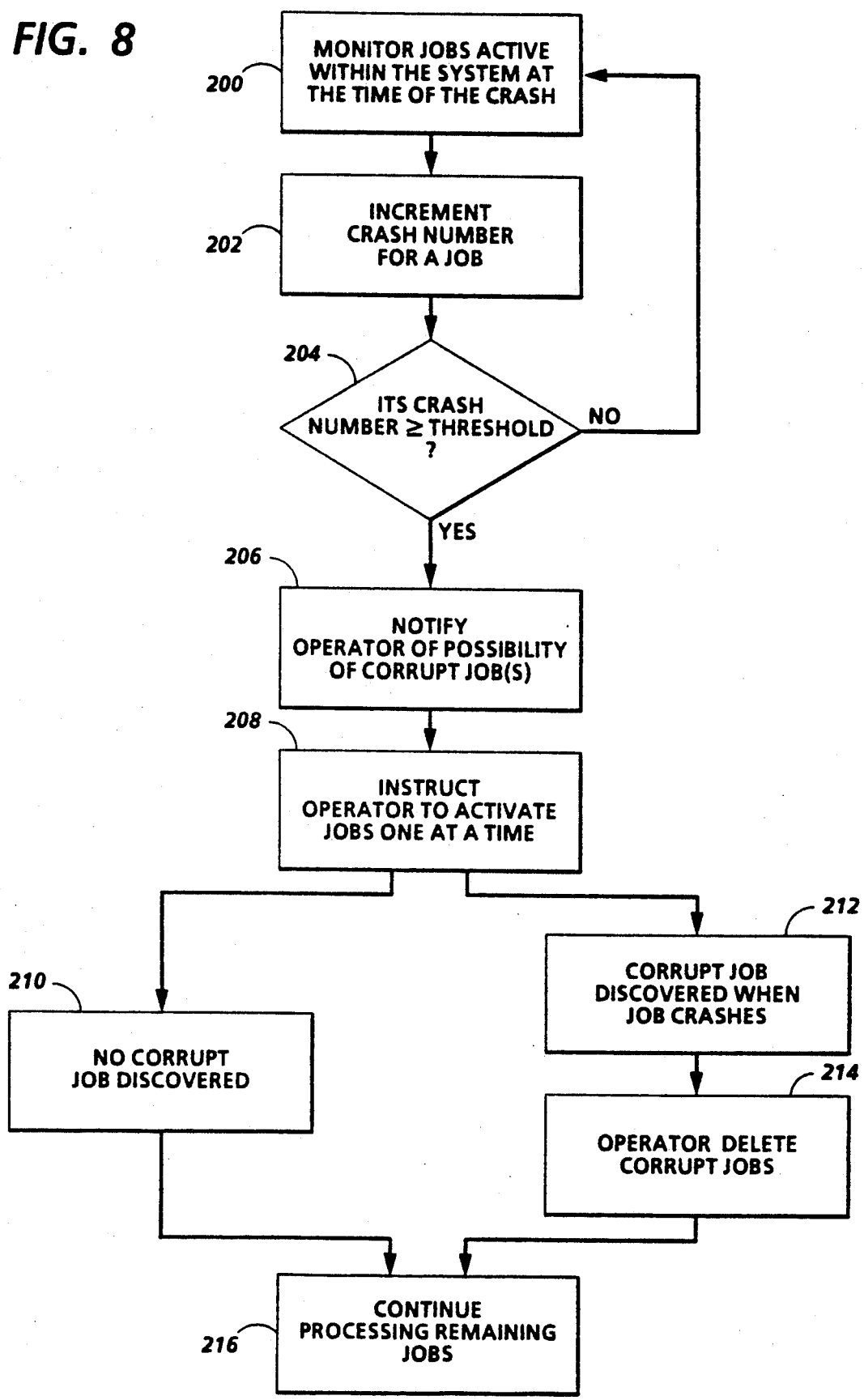

METHOD AND APPARATUS FOR OPERATING AN ELECTRONIC REPROGRAPHIC PRINTING SYSTEM CONTAINING A JOB SUBMIT COUNTER

BACKGROUND OF THE INVENTION

1. Field of the Invention

The present invention relates to electronic printers and printing systems, and more particularly, to a method of monitoring the number of times a job concurrently active with other jobs in the system crashes.

2. Description of the Related Art

In electronic reprographic printing systems, a complex series of interactions occurs between the software services and objects and the hardware functions to provide the printed or otherwise processed end-product. In such a system, a document or series of documents comprising at least one print job are successively scanned, resulting in image signals which are electronically stored. The signals are later read out successively and transferred to a printer for formation of the images on paper. Such a document can be printed any number of times or processed in any number of ways (e.g., words deleted or added; image magnified or reduced, etc.). If a plurality of documents comprise a job which is being processed, the processing or manipulation of the documents can include deletion of one or more documents, reordering of the documents into a desired order, or addition of a previously or subsequently scanned document or documents. The printing or processing can be relatively synchronous with scanning, or asynchronous after scanning. If asynchronous, a time interval exists between scanning and printing or processing. The system can then accumulate a number of scanned jobs in the system for subsequent processing or printing. The order of the jobs to be printed may be different from the order of jobs as scanned depending on the priority of the jobs and the desires of the operator for increasing productivity or through-put and decreasing printer or scanner downtime.

In such a system, faults on all levels of functioning at some time during the system's operation can occur. Software object faults may occur to result in such problems as software/hardware errors, illegal job parameters, corrupted data, resource problems, input master errors, font problems, etc. Mechanisms for dealing with such faults are an integral and necessary component of the system, because such faults will result in the interruption of the system's operation and may result in a crash of the system which requires that the system be rebooted. Information from the system provided to the operator directing the operator to the fault or faults causing the job interruption is critical to the efficient operation of the system.

An important item of information is the number of times a fault occurs in the system. One method of acquiring and supplying this information to the operator is by recording the faults in a log. By doing so, a threshold number of faults can be established and used to determine the need for further diagnostic action on the system.

In a similar manner, it is important for the system to keep track of the number of times that a system crashes along with a record of the jobs which are concurrently active within the system at the time of the crash. Such information is valuable to an operator because it may enable the operator to remove the source of the crash, which is itself immediately disruptive to the work being performed by the system, without requiring the system to cycle-down in order to resolve the source of the crash. Such a procedure requires a rebooting of the system, which is time-consuming and significantly decreases the efficiency of the system.

The related art has disclosed printing systems which contain systems for identifying, counting and evaluating errors.

U.S. Pat. No. 4,866,712 to Chao discloses a table-driven recovery control system for computers wherein a data table records all identified errors in an error table, and all corrective actions in an action table. The table includes a count increment for each action in response to an error and such counts are accumulated until a count threshold is exceeded, at which time a corrective action is initiated.

U.S. Pat. No. 4,339,657 to Larson et al. discloses a control system which supplies command signals to initiate system functions and which has a means for producing error signals that indicate malfunctions of the system. An error counter responds to error signals to provide a count value representing the total number of error signals which have occurred. Additionally, a sensing means produces a value signal when the error count exceeds a given value.

U.S. Pat. No. 4,745,602 to Morrell discloses a printer error and control system wherein the printer provides a specific error status indication to the system host. The error signals comprise fatal and nonfatal classes of system errors. Upon the occurrence of certain nonfatal errors, the host computer may invoke a procedure to reset the data output device and adjust its output data flow to provide a corrective measure.

U.S. Pat. No. 4,908,811 to Yokogawa et al. discloses a method for recording and reproducing data with error reduction. An error ratio is calculated which, when greater than a predetermined value, adjusts a delay circuit.

While the prior art provides for the recordation of errors in various computer and reproducing systems, and for the system's response when the recorded errors reach a threshold level, the prior art fails to disclose a program within the system which provides the operator with the instructions and means by which the job within the system causing the problem can be determined without requiring the system to cycle-down. It is desirable for a system to have a corrective mechanism programmed within it which interacts with the operator, and permits the operator's judgements to be factored into such decisions as deletion of jobs or data in the system in order to effect recovery as efficiently as possible.

OBJECTS AND SUMMARY OF THE INVENTION

Accordingly, one object of the present invention is to provide an electronic reprographic system which provides for a job submit counter to keep track of the number of times a job is active and the system crashes.

Another object of the present invention is to provide an electronic reprographic system wherein the system notifies the operator of the possibility of a corrupt job in the system when the counter reaches a predetermined level for a faulted job.

Another object of the present invention is to provide an electronic reprographic system wherein the operator is provided with instructions by the system to activate the jobs one at a time to determine whether a crash is caused by a corrupt job.

A further object of the invention is to provide an electronic reprographic system wherein the operator can recover from a corrupt job by deleting the job.

To achieve the foregoing and other objects, and to overcome the shortcomings discussed above, an electronic reprographic system for printing a job is provided which monitors the number of jobs active in a system and the occurrence of crashes within the system, monitors the number of times a specific job is active in the system and the system crashes, compares this occurrence with a predetermined threshold number, notifies the operator of a corrupt job or possibly corrupt jobs, and provides instructions to the operator for the deletion of the corrupt job.

BRIEF DESCRIPTION OF THE DRAWINGS

The invention will be described in detail with reference to the following drawings in which like reference numerals refer to like elements and wherein:

FIG. 8 is a flowchart depicting the operation of the FIG. 1 system employing the job submit counter.

DETAILED DESCRIPTION OF THE PREFERRED EMBODIMENTS

A. The System

Figure 1:
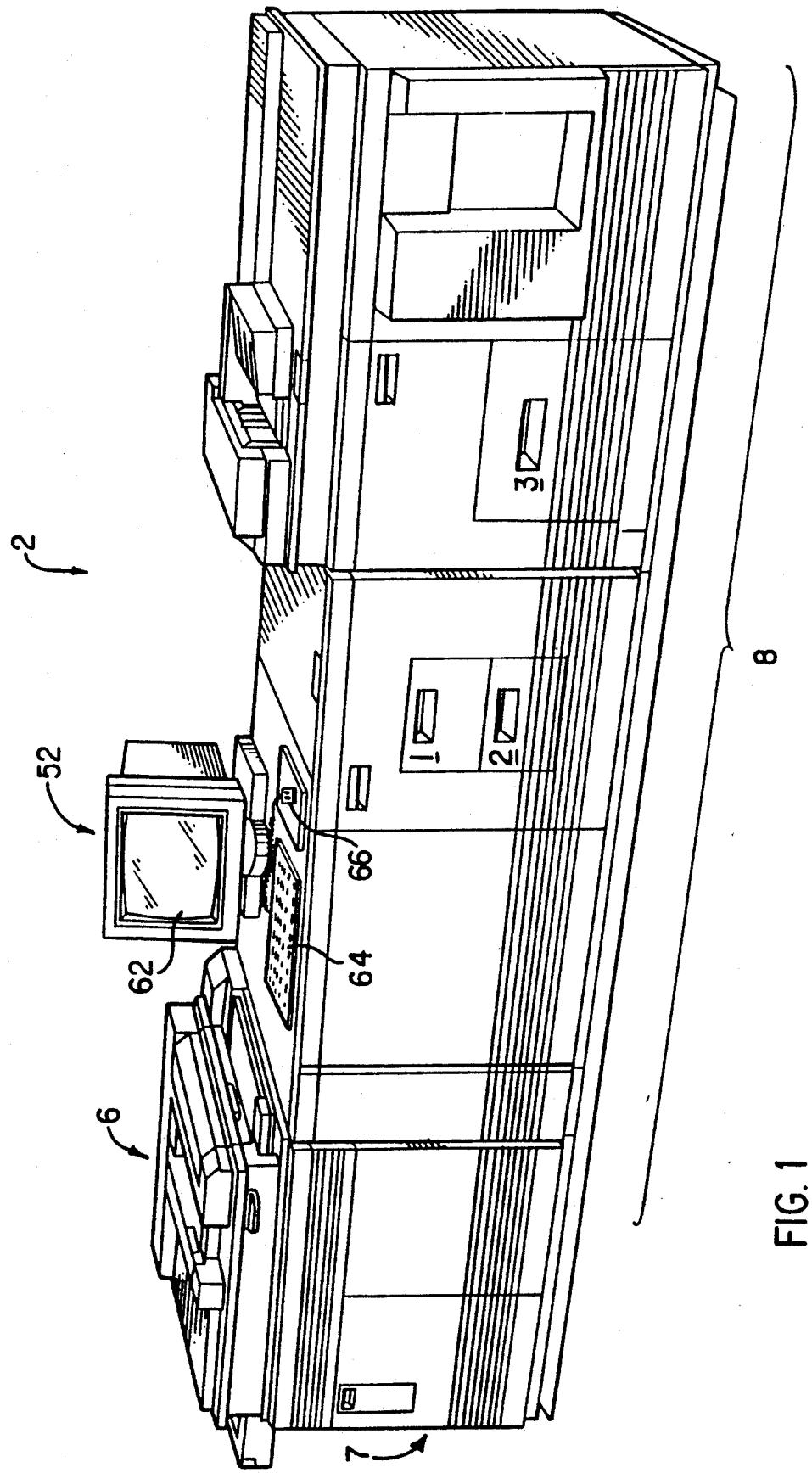
FIG. 1 is a view depicting an electronic printing system incorporating the print media identification system of the present invention.
Figure 2:
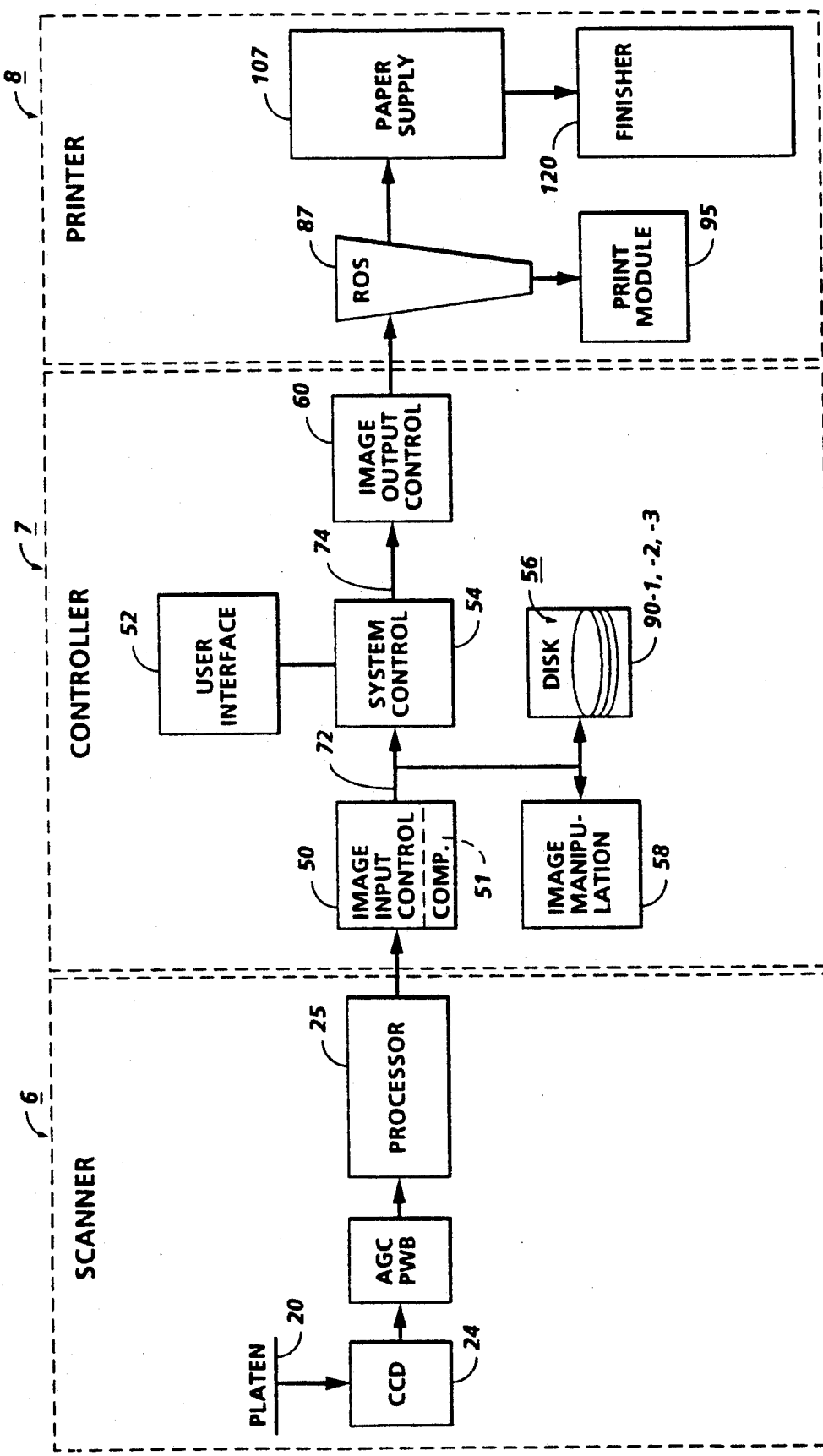
FIG. 2 is a block diagram depicting the major elements of the printing system shown in FIG. 1.

Referring now to the drawings, and particularly to FIGS. 1 and 2 thereof, there is shown an exemplary laser based printing system 2 for processing print jobs in accordance with the teachings of the present invention. Printing system 2, for purposes of explanation, is divided into a scanner section 6, controller section 7, and printer section 8. While a specific printing system is shown and described, the present invention may be used with other types of printing systems such as ink jet, ionographic, etc.

Figure 3:
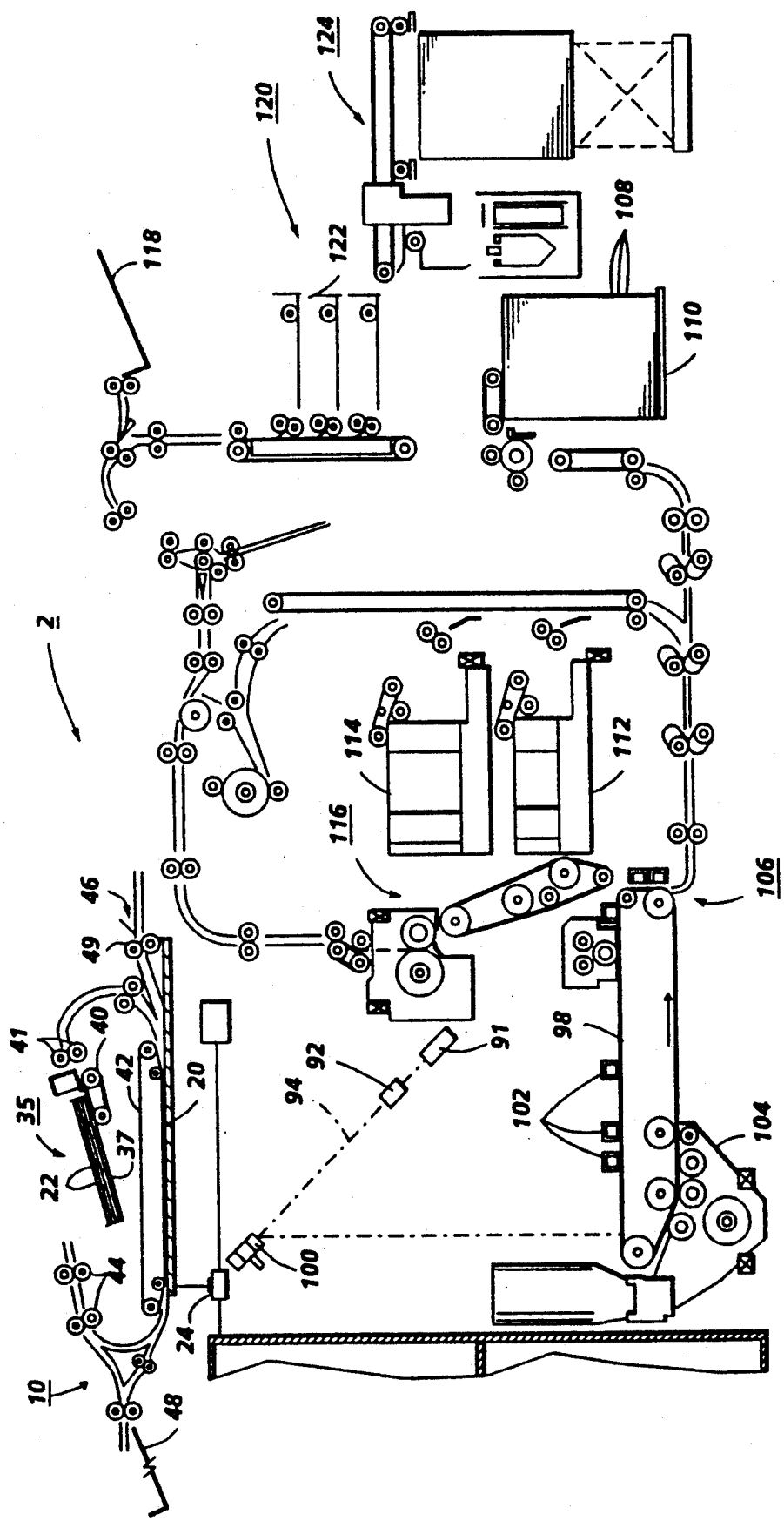
FIG. 3 is a plan view illustrating the principal mechanical components of the printing system shown in FIG. 1.
Figure 4:
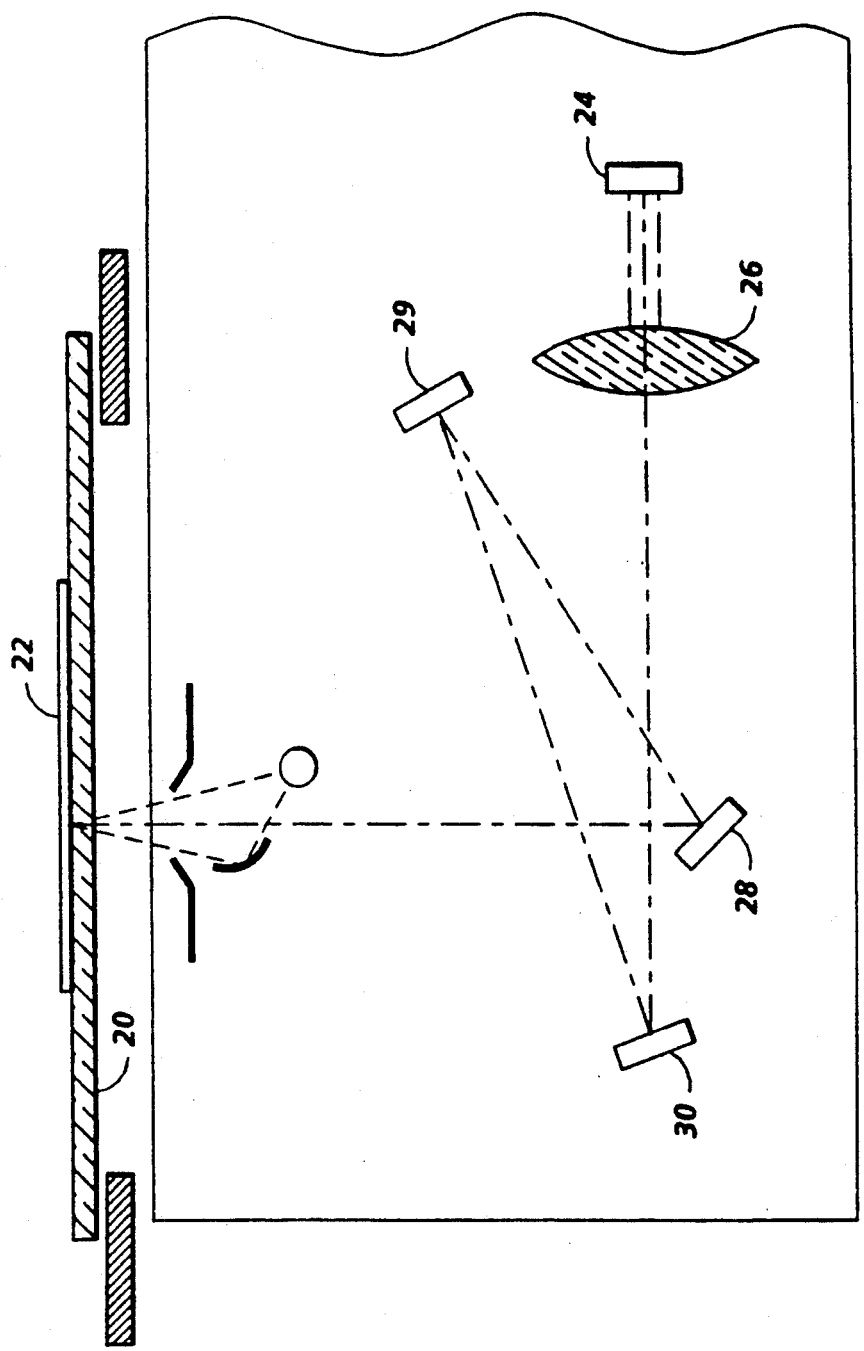
FIG. 4 is a schematic view showing certain construction details of the document scanner for the printing system shown in FIG. 1.

Referring particularly to FIGS. 2-4, scanner section 6 incorporates a transparent platen 20 on which the document 22 to be scanned is located. One or more linear arrays 24 are supported for reciprocating scanning movement below platen 20. Lens 26 and mirrors 28, 29, 30 cooperate to focus array 24 on a line-like segment of platen 20 and the document being scanned thereon. Array 24 provides image signals or pixels representative of the image scanned which, after suitable processing by processor 25, are output to controller section 7.

Processor 25 converts the analog image signals output by array 24 to digital and processes the image signals as required to enable system 2 to store and handle the image data in the form required to carry out the job programmed. Processor 25 also provides enhancements and changes to the image signals such as filtering, thresholding, screening, cropping, reduction/enlarging, etc. Following any changes and adjustments in the job program, the document must be rescanned.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40, document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer and, for purposes of explanation, is separated into a Raster Output Scanner (ROS) section 87, Print Module Section 95, Paper Supply section 107, and Finisher 120. ROS 87 has a laser 90, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108 as will appear may comprise any of a variety of sheet sizes, types, and colors. For transfer, the print media is brought forward in timed registration with the developed image on photoreceptor 98 from either a main Paper tray 110 or from auxiliary Paper trays 112, or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books.

Referring to FIGS. 1, 2 and 5, controller section 7 is, for explanation purposes, divided into an image input controller 50, User Interface (UI) 52, system controller 54, main memory 56, image manipulation section 58, and image output controller 60.

Figure 5A:
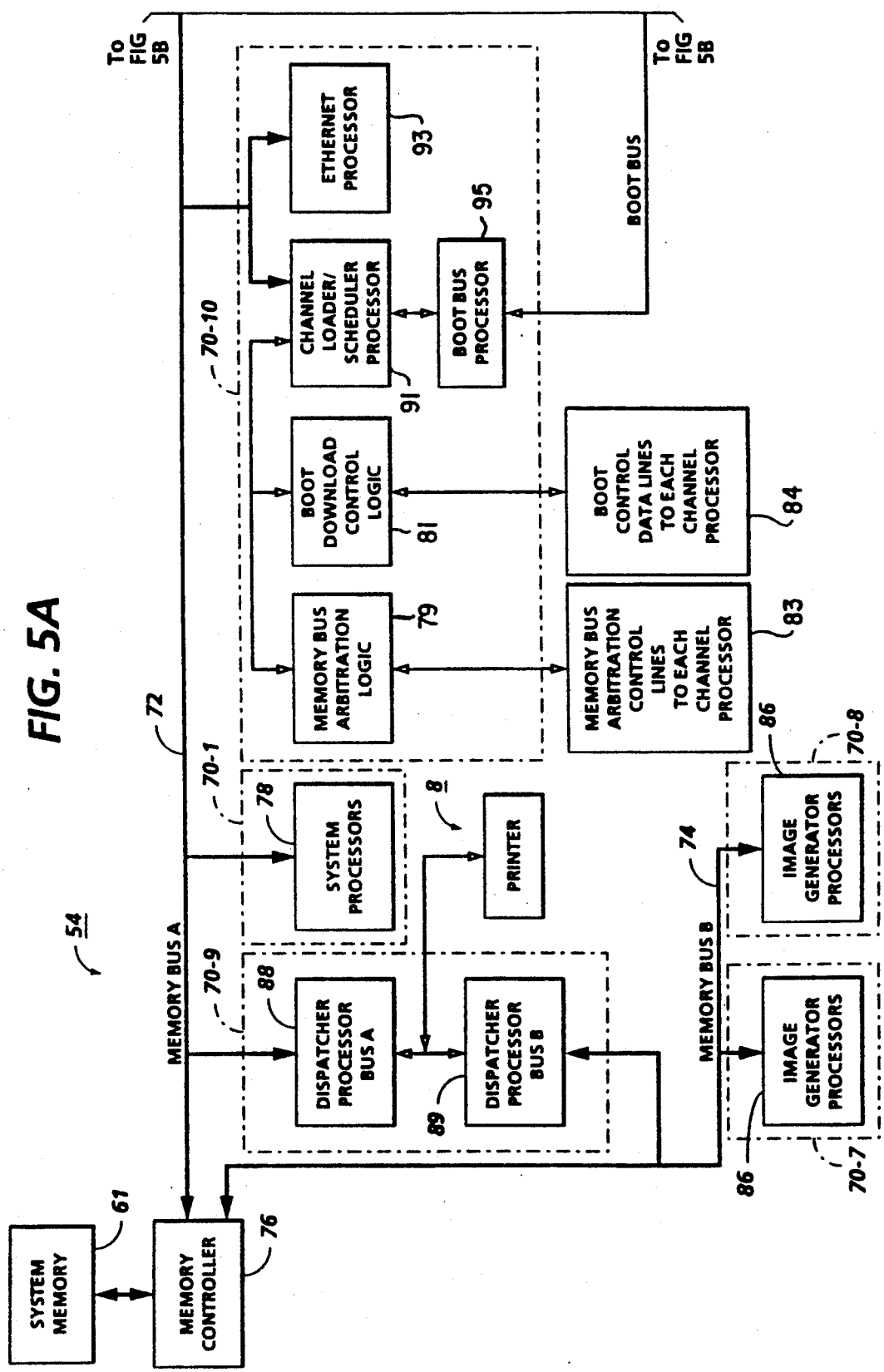
FIGS. 5A, 5B, and 5C comprise a schematic block diagram showing the major parts of the control section for the printing system shown in FIG. 1.
Figure 5B:
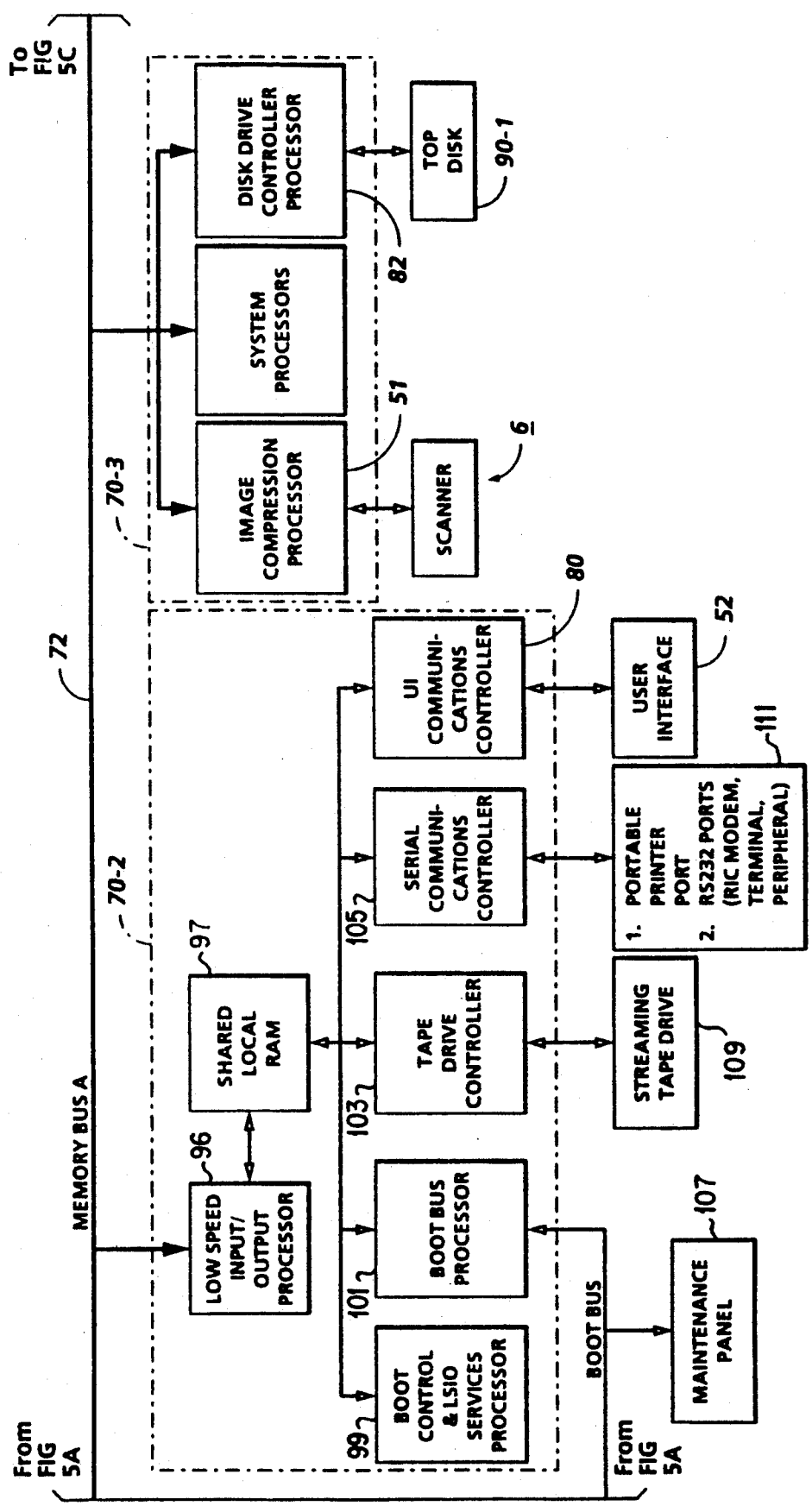
Figure 5C:
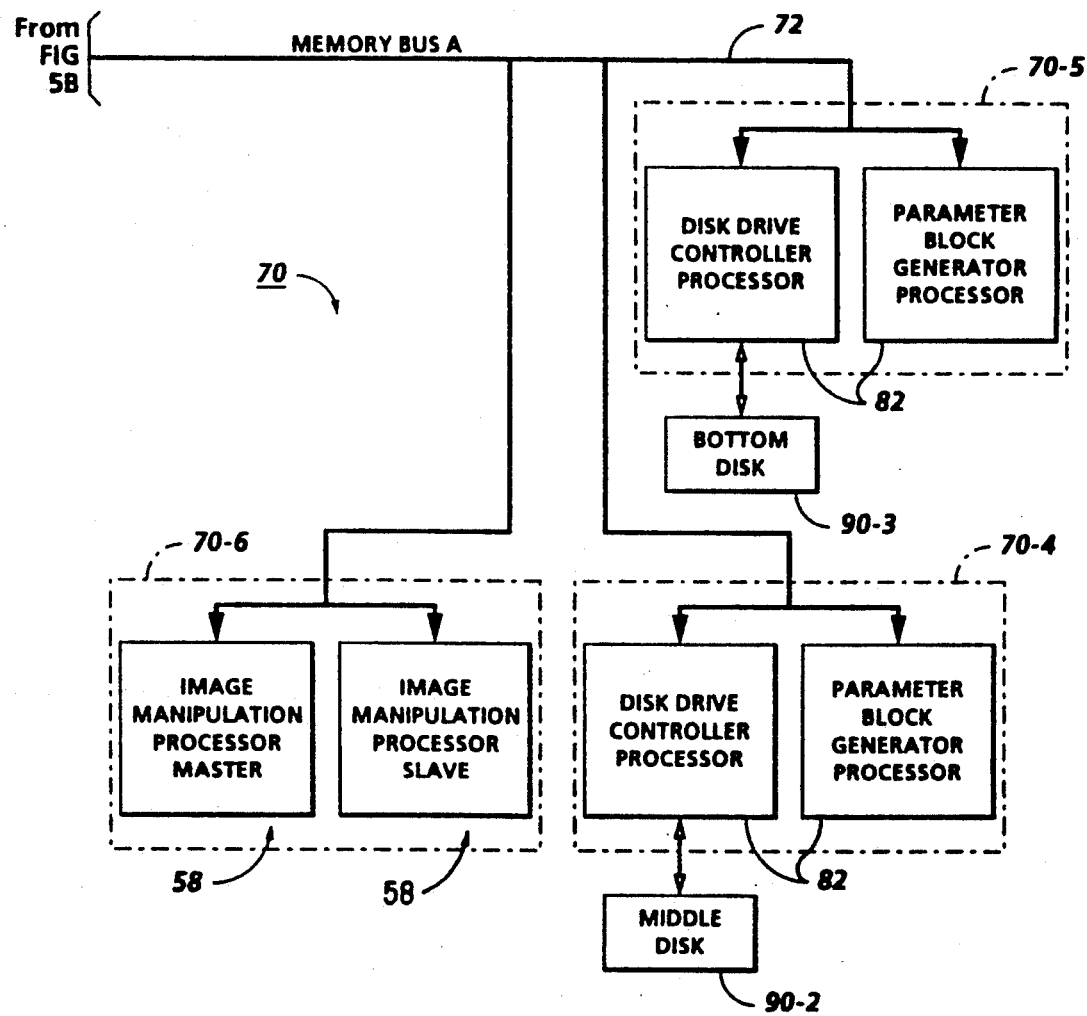

Referring particularly to FIGS. 5A-5C, control section 7 includes a plurality of Printed Wiring Boards (PWB's) 70, PWB's 70 being coupled with one another and with System Memory 61 by a pair of memory buses 72, 74. Memory controller 76 couples System Memory 61 with buses 72, 74. PWB's 70 include system processor PWB 70-1 having plural system processors 78; low speed I/O processor PWB 70-2 having UI communication controller 80 for transmitting data to and from UI 52; PWB's 70-3, 70-4 and 70-5 having disk drive controller/processors 82 for transmitting data to and from disks 90-1, 90-2 and 90-3, respectively, of main memory 56 (image compressor/processor 51 for compressing the image data is on PWB 70-3); image manipulation PWB 70-6 with image manipulation processors of image manipulation section 58; image generation processor PWB's 70-7 and 70-8 with image generation processor 86 for processing the image data for printing by printer section 8; dispatch processor PWB 70-9 having dispatch processors 88 and 89 for controlling transmission of data to and from printer section 8; and boot control-arbitration-scheduler PWB 70-10 which includes memory bus 79, boot down load control 81, memory bus 83, boot control 84, loader/processor 91, ethernet processor 93 and boot bus processor 95.

Specifically referring to FIG. 5B, low speed I/O processor PWB 70-2 includes low speed I/O processor 96 communicating through shared local ram 97 with boot control processor 99, boot bus processor 101, tape drive controller 103, serial communications controller 105 and communications controller 80, and further includes maintenance panel 107, tape drive 109 and ports 111.

The scanned image data input form processor 25 of scanner section 6 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc., are carried out. Following processing, the data may be returned to main memory 56, sent to UI 52 for display on touchscreen 62, or sent to image output controller 60.

Image data output to image output controller 60 is decompressed and readied for printing by image generating processors 86 of PWB's 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Figure 6:
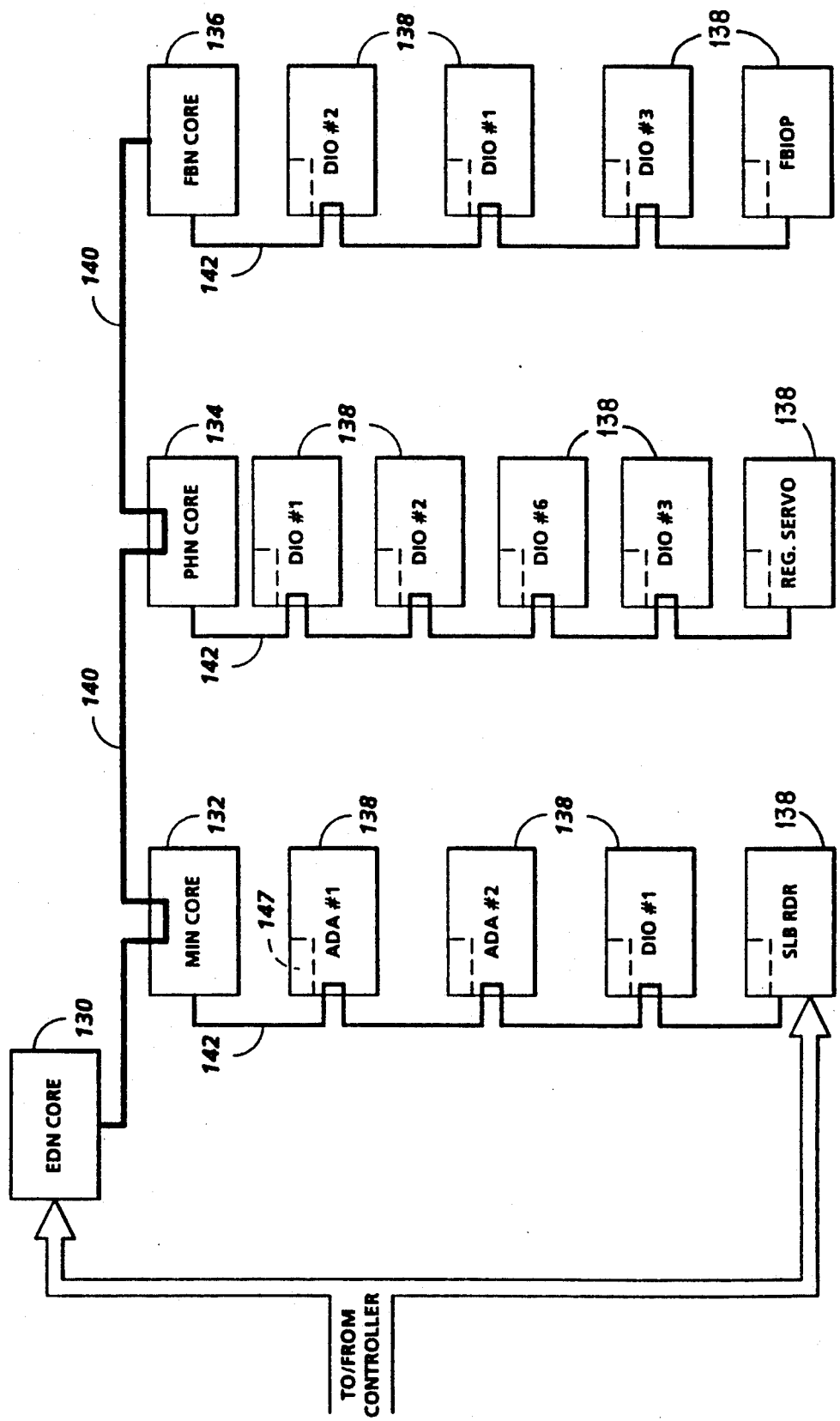
FIG. 6 is a block diagram of an Operating System, together with Printed Wiring Boards and shared line connections/for the printing system shown in FIG. 1.

Referring particularly to FIG. 6, system control signals are distributed via a plurality of printed wiring boards (PWB's). These include EDN core PWB 130, Marking Imaging core PWB 132, Paper Handling core PWB 134, and Finisher Binder core PWB 136 together with various Input/Output (I/O) PWB's 138. A system bus 140 couples the core PWB's 130, 132, 134 and 136 with each other and with controller section 7 while local buses 142 serve to couple the I/O PWB's 138 with each other and with their associated core PWB.

On machine power up, the Operating System software is loaded from memory 56 to EDN core PWB 130 and from there to the remaining core PWB's 132, 134 and 136 via bus 140, each core PWB 130, 132, 134, 136 having a boot ROM (not shown) for controlling downloading of Operating System software to the PWB, fault detection, etc. Boot ROMs also enable transmission of Operating System software and control data to and from PWB's 130, 132, 134 and 136 via bus 140 and control data to and from I/O PWB's 138 via local buses 142. Additional ROM, RAM, and NVM memory types are resident at various locations within system 2.

Figure 7:
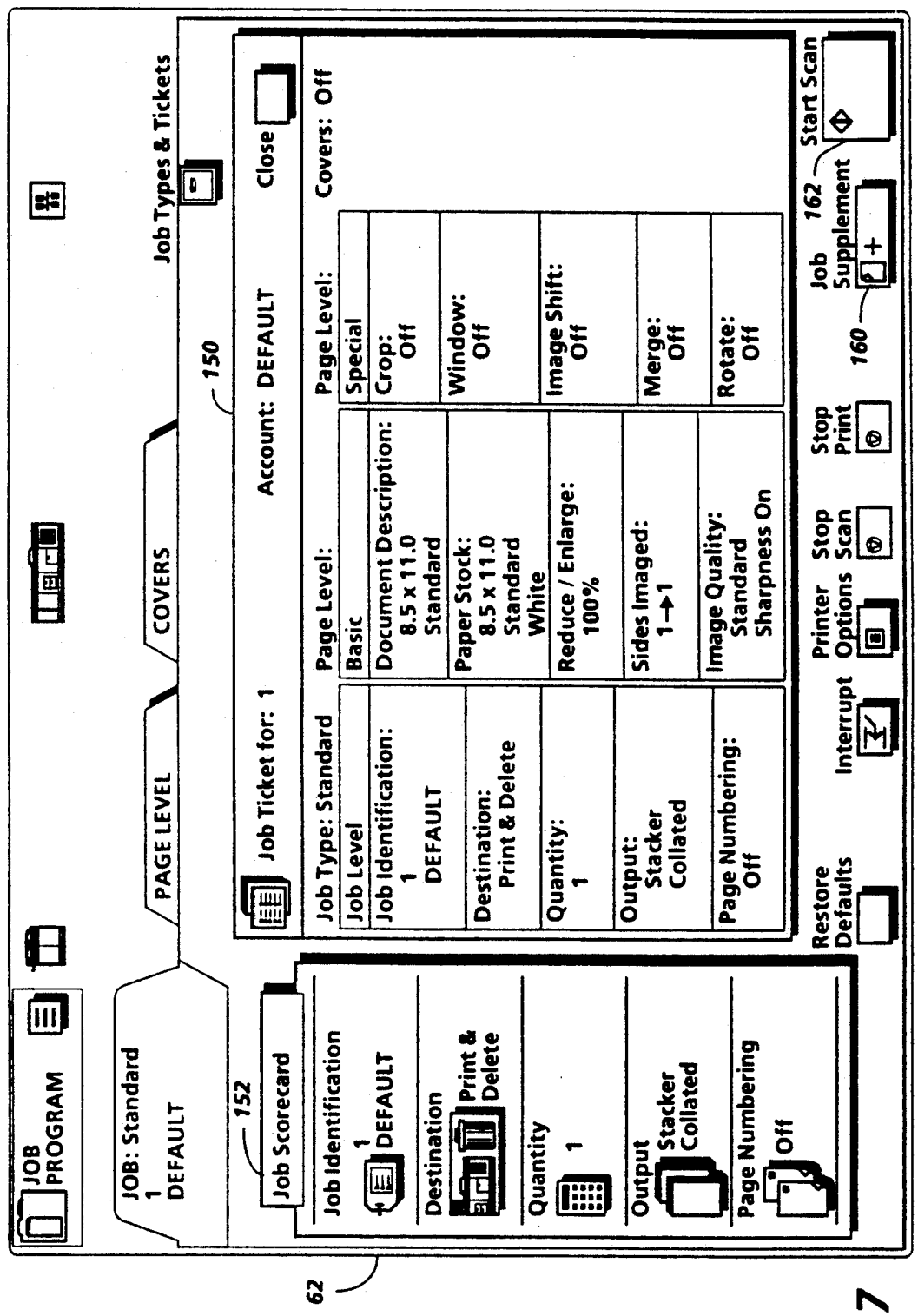
FIG. 7 is a view depicting an exemplary job programming ticket and job scorecard displayed on the User Interface (UI) touchscreen of the printing system shown in FIG. 1.

Referring to FIG. 7, jobs are programmed in a Job Program mode in which there is displayed on touchscreen 62 a Job Ticket 150 and a Job Scorecard 152 for the job being programmed. Job Ticket 150 displays various job selections programmed while Job Scorecard 152 displays the basic instructions to the system for printing the job.

B. Job submit Counter for Handling Faults

A fault or crash is an unpredictable condition in any part of the system 2 which causes a subset of the system elements to become unavailable to the operator. Some examples are:

At the system level: Where a reboot (restart of the system after a crash which could be initiated by the system or through an operator intervention at UI 52) or a repowering (initiated by an operator only, but could include a loss of power) occurs.

At the system element level: Where the system attempts to recover automatically by reinitializing or resoftloading the system element. Additionally, during certain fault recovery procedures, the operator may cause the system to reinitialize or resoftload the system elements to achieve recovery.

At the hardware level: When the system hardware becomes inoperable.

The system includes a crash recovery operation which will return the system elements to a functional state after a crash has occurred. During recovery, the initial cause of the crash (i.e., the fault) must be cleared. Whenever possible, the first attempt at recovery will be automatic, with no operator intervention, and without impact to the other system elements. If assistance is required, it will be at the operator level. If a hardware failure is detected during the system self-test, a fault code will be displayed at UI 52 to alert the operator that a service call is in order.

Categories of crashes which occur in system 2 include:

1) those that the operator can perceive are automatically recoverable;

2) those which cause the system to automatically recover to a certain level, but which also require the operator to assist in order to finish recovery; and 3) those in which the system cannot automatically recover, and which require the operator to initiate the process of recovery (e.g., booting, cycling power).

If a fault occurs in a software object and is detected (i.e., jobs, merge items), the object is marked as faulted when the problem is detected, and information necessary for operator clearance is added to the object. The system 2 automatically aborts all services which are actively working on the object. For example, if a job is stream printing (i.e., printing a portion of a job while scanning another portion of the same job), and scan detects the problem, printing is stopped also.

In an electronic reprographic system of the size and complexity as described herein, a large number and diverse range of both software and hardware faults are possible. Individually, each fault is important to a specific component of the system 2, but the fault may also be a contributing factor to a system crash.

The controller section 7 can monitor and control a plurality of jobs which are in the job queue, i.e., jobs which have been scanned for entry into memory and are arranged in a line of jobs waiting for further processing and/or printing. Accordingly, many jobs can be concurrently active. Due to the concurrency, it is difficult to determine if a particular active job (or combination of active jobs) is the cause of a system crash.

In accordance with an aspect of the invention, the system controller 7 includes a job submit counter, which provides for a comprehensive recordation of all the jobs which are concurrently active in the system, and the number of times that a job is active and the system crashes. The controller also contains a predetermined threshold level for the number of times a job is faulted. When this threshold number is reached, the system 2 provides the operator through the UI 52 with the information that a job in the system 2 may be corrupt. The operator is provided instructions through the UI 52 to activate the concurrent jobs one at a time to determine whether a crash is being caused by the concurrency of jobs in the system or by a single corrupt job within the system 2. When a corrupt job is detected, the system 2 instructs the operator through the UI 52 to delete the job. In this manner, the present invention provides for a job submit counter to allow the operator to determine from a list of all possible jobs what job has become corrupted and is causing the system to crash.

A summary of the invention is provided in FIG. 8. The controller section 7 of the system 2 is continually monitoring the jobs being processed in the system 2 for faults (Step 200). The programs within the controller section 7 contain a means for counting the number of times each job active in the system 2 crashes; in the event of multiple jobs concurrently active it maintains a count for each individual job (stop 202). The programs further provide for a comparison of this number with a crash threshold number. When the number of crashes exceeds the crash threshold number (Step 204), the system 2 notifies the operator through the UI 52 (Step 206) that a job or jobs may be corrupted. The system 2 also provides the operator through UI 52 with instructions regarding the activation and analysis of each job individually in order to determine the corrupted job (Step 208). In the event that no corrupt job is detected by this individual job activation and analysis (Step 210), (which could occur if the crash was solely a result of the concurrency of the jobs), then the system will continue to process the remaining jobs (Step 216): In the event that a corrupt job is discovered by the reoccurrence of a crash when that job is activated (Step 212), the operator is instructed to delete the corrupted job (step 214) and permitted to resume processing of the non-corrupted jobs (Step 216).

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A method for recovering from crashes in an electronic reprographic system in which a plurality of jobs are active concurrently, comprising the steps of:

monitoring the jobs active in the system;

monitoring the system to determine occurrence of a crash;

counting a number of times a specific job is concurrently active and the system crashes, said number being designated a crash number;

comparing the crash number with a predetermined threshold crash number to determine whether the crash number is at least as great as the predetermined threshold crash number and;

notifying an operator that at least one of the jobs concurrently active in the system is corrupted when the crash number is at least as great as the predetermined threshold number.

2. The method as recited in claim 1, further comprising the step of providing the operator with instructions to activate the jobs one at a time to determine which job is corrupt.

3. The method as recited in claim 2, further comprising the step of providing instructions to the operator to delete a corrupt job.

4. An apparatus for an electronic reprographic system in which a plurality of jobs are active concurrently, comprising:

means for monitoring the jobs active in the system;
means for monitoring the system to determine occurrence of a crash in the system;

means for counting the number of times a specific job is concurrently active and the system crashes, said number being designated a crash number;

means for comparing the crash number with a predetermined threshold crash number to determine whether the crash number is at least as great as the predetermined threshold crash number and;

means for notifying an operator that at least one of the jobs concurrently active in the system is corrupted with the crash number is at least as great as the predetermined threshold number.

5. The apparatus as recited in claim 4, further comprising means for providing the operator with instructions to activate the jobs one at a time to determine which job is corrupt.

6. The apparatus as recited in claim 5, further comprising means for providing instructions to the operator to delete a corrupt job.

* * * * *